United States Patent

[11] 3,628,447

| [72] | Inventor | George Levenback<br>Swampscott, Mass. |
|---|---|---|
| [21] | Appl. No. | 5,517 |
| [22] | Filed | Jan. 26, 1970 |
| [45] | Patented | Dec. 21, 1971 |
| [73] | Assignee | Joseph M. Linsey Corp.<br>Somerville, Mass. |

[54] HOT FOOD DISPLAY UNIT
11 Claims, 3 Drawing Figs.

[52] U.S. Cl. ............................................. 99/341,
99/447, 99/448
[51] Int. Cl. ............................................. A47j 39/02
[50] Field of Search ............................................. 99/341,
285, 443, 192, 447, 448; 62/246, 247, 248, 249,
250, 251, 252, 253, 254, 255, 256; 126/19.5, 20,
21, 33, 37, 261, 268, 337; 312/114, 116, 236

[56] References Cited
UNITED STATES PATENTS
3,088,396  5/1963  Proffitt.......................... 99/443 R

| 3,115,719 | 12/1963 | Mapson......................... | 312/114 X |
| 3,170,541 | 2/1965 | Werner.......................... | 126/37 X |
| 3,186,185 | 6/1965 | Bently et al..................... | 62/255 |
| 3,261,650 | 7/1966 | Stromgrist...................... | 312/236 |
| 3,306,068 | 2/1967 | Allgeyer et al.................. | 62/256 |
| 3,369,375 | 2/1968 | Gerweck et al................. | 62/256 |
| 3,392,544 | 7/1968 | Perez............................. | 62/256 |

Primary Examiner—Walter A. Scheel
Assistant Examiner—Arthur O. Henderson
Attorney—Wolf, Greenfield & Sacks ABSTRACT: A hot food display and vending unit for popcorn or the like including a plurality of vertically spaced trays mounted to a vertical support. The upper surface of each tray supports the food package. The underside of each tray includes radiant heating means directed downwardly toward the food supported by a tray immediately below to heat the food supported thereon. The unit includes a device which recirculates air through a passage in the underside of each tray and then directs the air downwardly above the periphery of each tray to generate a thermal curtain about the space where the food is displayed.

PATENTED DEC 21 1971　　　　　　　　　　　　3,628,447

INVENTOR
George Levenback
BY
Wolf, Greenfield, Hieken + Sacks

HOT FOOD DISPLAY UNIT

BACKGROUND OF THE INVENTION

A number of arrangements have been proposed and employed in the prior art to display vendable foods such as popcorn or hot dogs while maintaining these foods in a heated, ready-to-eat condition. For example, most popcorn-vending devices store the popcorn in bulk and attempt to maintain the popcorn uniformly heated while in bulk storage. The operator fills an individual package with popcorn at the request of the customer. Because the popcorn is stored in bulk it is not heated evenly and frequently it may be cold by the time it is served to the customer. Furthermore, the bulk storage technique does not enable the popcorn to be displayed in a ready-to-carry condition and it is obvious to the customer that he necessarily must wait for the popcorn to be packaged.

In some instances devices have been proposed to display the packaged popcorn while maintaining the package in a heated condition and in readiness to be sold to the customer. These devices generally have employed heating means which cause the supporting surfaces of the device to become quite hot and, perhaps, even be dangerous to the touch. It is among one of the primary objects of my invention to provide a combined display and heating unit for such vendable foods which maintains the food in a heated and on display yet which is not dangerous to the operator or the customer. Devices of the character described generally are used in theaters or other areas which normally are cool and air-conditioned, particularly during the summer months. This presents a further difficulty in that self-service display units which expose the food to the environment may not maintain the displayed food products in a warm condition. The food tends to become cold in a short period of time because of the generally air-conditioned environment. One of the primary objects of my invention is to provide a food display unit which keeps the food warm even in an air-conditioned environment.

SUMMARY OF THE INVENTION

My invention relates to a display unit in which the vendable food may be displayed in a prepackaged, ready-to-carry condition and which displays the packages clearly from about all sides of the vending device. The unit includes a number of generally horizontal trays which are secured to a vertically disposed support so that the trays generally are in vertical alignment with each other and are spaced vertically from each other. The packaged food is intended to be placed on the top surface of each tray. The underside of each tray supports radiant heaters which direct radiant heat downwardly toward the food supported on the next lowermost tray in the stack.

The unit includes an air circulation unit which generates a warm thermal curtain about the region where the food is stored and displayed and also maintains the surfaces of the device relatively at a temperature which the operator or customer may touch without danger. This circulation system is built into the vertical support and trays. The vertical support is hollow and has an inlet opening near its bottom region. A squirrel cage blower ingests air through the inlet opening and forces the air upwardly through the hollow support toward and into the upper trays in the stack. The structure of the trays includes flow channel means which receive the air from the vertical support. The flow channel means includes a heating baffle arrangement by which the air entering into each tray is heated and directed to the outer periphery of the tray and then downwardly toward the next lower tray. The downwardly directed air forms the thermal curtain about the region where the prepackaged food is stored. In addition, the air flow of the curtain and the air flow induced by the air curtain causes convection currents which tend to draw the air over the surfaces of the device thus maintaining the surfaces at a temperature which is not too hot to the touch.

One of the objects of the invention is to provide a display unit for vendable foods which enables the foods to be displayed in a prepackaged condition yet maintains the food in a heated, ready-to-eat condition.

Another object of the invention is to provide a display unit for prepackaged foods which enables the packages to be viewed clearly from all about the device.

A further object of the invention is to provide a heating and display unit of the character described which includes means for maintaining the surfaces of the display unit at a cool, touchable temperature.

Another object of the invention is to provide a device of the character described which includes an integral thermal curtain for maintaining foods warm even in an air-conditioned environment.

Still another object of the invention is to provide a display unit which may be loaded by the operator with the packages of vendable food at his leisure and which permits the customer to serve himself.

BRIEF DESCRIPTION OF THE DRAWINGS

These and other objects and advantages of the invention will be apparent from the following detailed description thereof with reference to the accompanying drawings wherein:

As shown in FIGS. 1 and 2, the display unit includes a base tray 10, and intermediate tray 12 and a top tray 14. The trays 10, 12, 14 are arranged in generally as shown and are secured and supported in this position by means of a hollow upright support 16 which is fastened, as by welding, bolts, or other common means to the rearward edge of the trays. The trays 10, 12, 14 define the food support and display regions 18 and 20. The base tray 10 may include a number of feet 22 secured to its underside for placing the unit on a suitable support such as a table top or candy counter.

Although only three trays are shown in the illustrative embodiment of the invention, the device may include a greater number of trays with a correspondingly greater number of food display regions. The intermediate trays 12, however, do not extend forwardly to the same extent as do the top and base trays 14 and 10, for a purpose later described.

Figure 2:
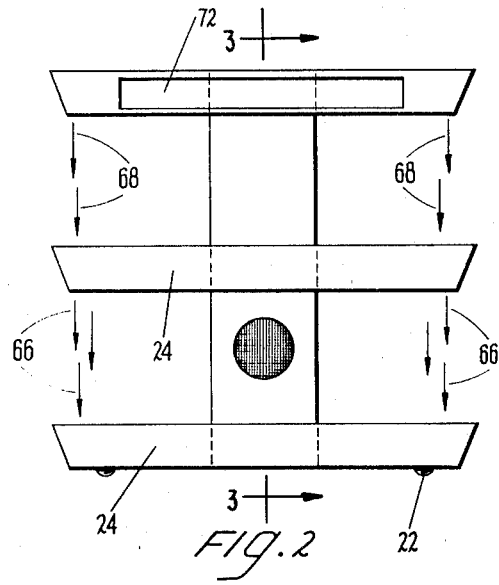
FIG. 2 is a front elevation of the display unit.

FIG. 2 shows the internal construction of the intermediate tray 12, such construction being representative of each tray except the base tray 10. Each tray includes a sidewall 24 which extends continuously about and defines the periphery of the tray. The sidewall 24, as the other parts of the unit, may be fabricated from sheet metal and, preferably, from stainless steel. Each tray also includes a supporting surface 26 on which the packaged food is placed. The supporting surface 26 is secured to the sidewall 24 at a level such that the surface 26 is disposed below the upper edge 28 of the sidewall, thus defining in an upwardly extending rib 30 which extends continuously about the supporting surface 26 and acts as a retainer to preclude the packaged food from falling off the supporting surface 28. The supporting surface 26 may include an upwardly extending peripheral wall 32 which may be fitted into a reverted edge 34 of the sidewall 24. The wall 32 and reverted edge 34 may be secured in this position by welding thus providing an integral firm connection.

The portion of the tray located below the food-supporting surface 26 includes one or more radiant heaters 36 with associated reflectors 38 which are mounted about and above the radiant heaters 36 to insure that the radiation which they emit will be directed downwardly toward the food supported on the next lower tray in the stack. The bottom of each tray is open to define a window 40 through which the radiation from the heaters 36 may pass. The window 40 is defined by the inner edge of an inwardly bent margin 42 at the lower of the sidewall 24. The margin 42 extends continuously about the bottom region of the tray. The radiant heaters 36 and associated reflectors 38 may be secured to the tray and supported on the inwardly bent margins 42. Additionally, it is preferred to provide a screen 44 over the window 40 to preclude one from inadvertently touching the radiant heaters 36. The screen 44 diffuses the heat evenly and permits the radiation to pass freely therethrough and downwardly toward the food display region below and also should be designed to cool rapidly to prevent the screen from becoming too hot.

An important feature of the invention resides in the provision of an air circulation unit which is effective both to surround the food display regions with a curtain of warm air to isolate the food from the environment and also to maintain the surfaces of the unit at a temperature which does not become too hot to the touch as a result of the overhead radiant heating.

Figure 3:
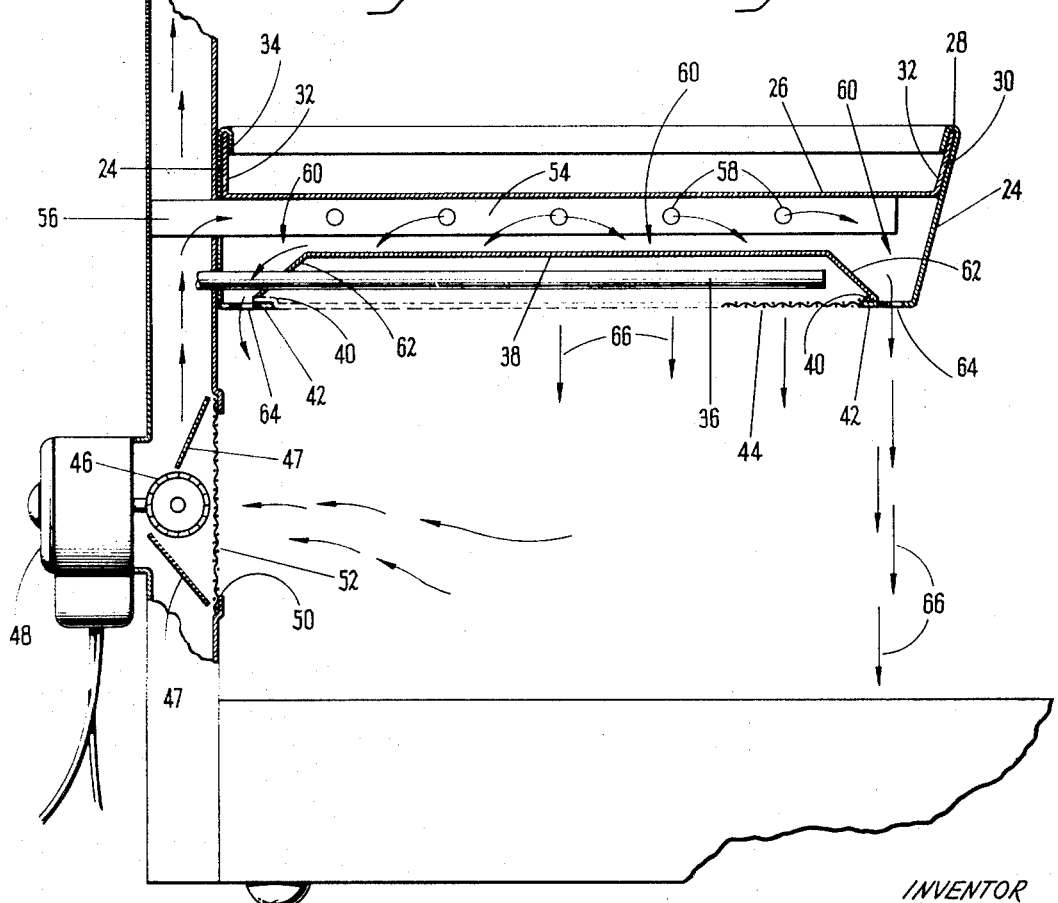
FIG. 3 is a section taken through the display unit along the plane 3—3 of FIG. 2 and illustrating the internal construction of the trays and air-cooling system.

As shown in FIG. 3 this arrangement includes a squirrel cage blower 46 mounted within the hollow upright support between the base tray 10 and intermediate tray 12. The blower 46 is driven by a conventional electric motor 48 which may be secured to the rearward external surface on the hollow upright support 16. The blower 46 is in communication with the lowermost food display region by means of an inlet opening 50 formed in the forward surface of the support 16. The opening 50 preferably is covered by a mesh screen 52 to preclude entry of contaminant particles such as dust and the like. The blower 46 preferably is provided with inlet baffles 47 which define a wide air inlet and narrow, upwardly opening outlet for the blower 46. The baffles 47 increase considerably the circulatory efficiency of the unit.

As the motor 48 drives the blower air is ingested from the lower food display region 18 and urged upwardly through the hollow support 16 toward the intermediate and top trays 12, 14. The upwardly forced air enters into each of the trays by means of a distribution manifold 54 having an inlet 56 which is in communication with the hollow upright support 16 to receive the upwardly blown air. The distribution manifold is supported within the tray beneath the supporting surface 26 and may be secured by direct fastening to the supporting surface 26, if desired. It is preferred that any connections between the distribution manifold 54 and supporting surface 26 be substantially airtight so that none of the air entering into the distribution manifold 54 will be directed upwardly through the supporting surface 26. Similarly, the supporting surface 26 and sidewall 24 should be secured to provide a substantially airtight seal.

Figure 1:
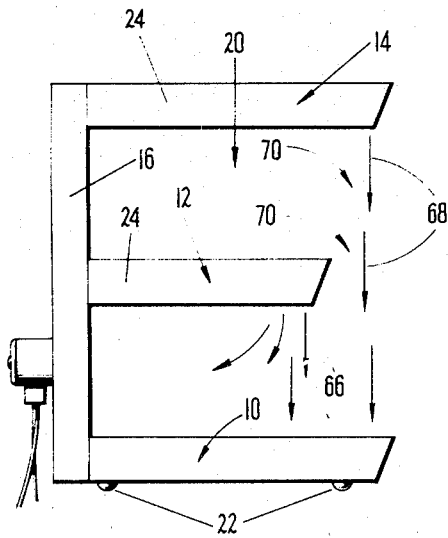
FIG. 1 is a side elevation of the display unit.

The air flows through the manifold 54 and outwardly from the manifold by means of distribution holes 58 which are spaced along the manifold. The air flows from the distribution holes into an internal chamber 60 defined between the lower surface of the supporting surface 26 and the upper internal surface of the reflector 38. The reflector 38 is heat-conductive so that it becomes quite hot as a result of the radiation from the heaters disposed immediately beneath the reflectors. The heated reflectors heat the air flowing through the internal chambers 60. The air is directed through the chamber to peripheral regions of the reflector which has a bent portion 62 to direct the air toward the external periphery of the chamber. Preferably, the baffle 62 cooperates with the inner surface of the sidewall to define a continually narrowing passage as the air flows toward the outlet slots 64 formed along the margin 42 of the sidewall 24. The narrowing passage increases the velocity of the air through the slots. The outlet slots 64 are arranged continually along the margin 42 to present a substantially continuous, downwardly opening port which surrounds the window 40. The heated air is thus directed downwardly and out through the slots to form a warm thermal curtain continually about the food display region immediately below that particular tray. For example, in the arrangement shown in FIGS. 1 and 2 the intermediate tray 12 generates a curtain indicated generally by the arrows 66. The top tray 14 would produce a curtain indicated by the arrows 68. Because the top tray 14 extends forwardly beyond the edge of the intermediate tray 12, the curtain 68 will extend about and include the curtain 66. Because the outer curtain 68 is directed downwardly about the intermediate tray 12 it will tend to draw air in the upper food display region outwardly and then downwardly along a path indicated generally by the arrows 70. Additionally, some of the air in the lower curtain 66 is drawn inwardly toward the inlet opening 50 to provide a continuous circulatory mode of operation. By circulating the air over and about the surfaces of the unit, the radiant heat absorbed by the outer surfaces of the unit is dissipated by the continuous air flow. This maintains the unit at a temperature which is not too hot to the touch. Additionally, because radiant heating elements are employed at the heating medium the continuous circulation of air does not disrupt the heating effect of the food. The air flowing over the hot baffle cools the baffle and surrounding metal surfaces. The heated air which is forced downwardly in the surrounding thermal curtain thus serves additionally to heat the food on display and retard cool air from the surrounding environment from reaching the warm food product. This arrangement is adventageous particularly when the unit is used for self-service and in an area which normally is air-conditioned or which is otherwise maintained relatively cool.

The device preferably includes a number of advertising and display aids such as, for example, a display plate 72 of glass or the like which may be mounted to the forward surface of the side wall 24 and which may be illuminated from within by an electric light bulb.

Thus, I have provided a display unit for vendable prepackaged foods which maintains the foods in a heated condition and which does not overheat the unit itself. Additionally, the unit is open and accessible from all sides which aids in displaying the vendable product as well as enhancing customer self-service.

It should be noted, however, that the foregoing description of my invention is intended merely to be illustrative thereof and that other embodiments and modifications will be apparent to those skilled in the art without departing from its spirit.

Having thus described my invention, what I desire to claim and secure by Letters Patent is:

1. A display unit for ready-to-serve foods comprising:
    a plurality of horizontal trays arranged in substantially vertical alignment and in vertically spaced relation to each other;
    standard means secured to said trays for supporting said trays in said vertically spaced configuration, said spaces between said trays defining food display regions;
    heating means adapted to heat said food display regions;
    means for generating a downwardly directed air curtain about and substantially enclosing each of said food display regions; and
    means for heating said air whereby said air curtain may be maintained at a warm temperature, said means for generating said downwardly directed air curtain including blower means adapted to impart a sufficient velocity to said downwardly directed air curtain as to maintain said air curtain.

2. A device as defined in claim 1 wherein said trays further comprise:
    a chamber formed integrally with each of said trays below the food-supporting surface thereof;
    and wherein said means for generating said downwardly directed air curtain comprises:
    means for introducing air into said chamber, said chamber having outlet means formed peripherally about its underside.

3. A device as defined in claim 2 further comprising:
    said means for heating said air being disposed within said chamber.

4. An apparatus as defined in claim 2 wherein said means for introducing air into said chamber comprises:
    said standard being of hollow construction;
    blower means mounted within said standard in the lower region thereof, for inducting air into said standard and directing said inducted air outwardly through said standards; and means for communicating each of said chambers with the hollow of said standard to direct said air into said chamber.

5. An apparatus as defined in claim 4 further comprising:

means for distributing the air within said chamber to the peripheral regions of said chamber, said chamber having downwardly directed outlet means and said peripheral regions thereof for directing said air downwardly in said curtain.

6. An apparatus as defined in claim 5 wherein said heating means comprises:

radiant heater means mounted to the underside of selected of said trays to heat the food display region immediately below; and reflector means secured to the underside of said tray above said radiant heating means, said reflector means defining a portion of said chamber.

7. An apparatus as defined in claim 6 wherein said reflector includes baffle means adapted to direct the air from said chamber toward said peripheral outlet formed in said chamber.

8. An apparatus as defined in claim 7 wherein said reflector means is heat-conductive and may be heated by radiant heater means, said reflector means defining said portion of said chamber and being effective to heat the air flowing through said chamber.

9. An apparatus as defined in claim 1 wherein each tray except the base tray includes said curtain-forming means, and wherein the uppermost tray includes outlet means for forming a curtain which embraces and includes the other curtains formed by the other of said trays.

10. An apparatus as defined in claim 9 wherein the uppermost of said trays extends forwardly of and beyond the forward edges of the lower of said trays.

11. An apparatus as defined in claim 9 further comprising: said curtain comprising heated air.

* * * * *